US011640675B2

(12) United States Patent
Guo et al.

(10) Patent No.: US 11,640,675 B2
(45) Date of Patent: May 2, 2023

(54) METHODS AND SYSTEMS FOR INTERPRETING TRAFFIC SCENES

(71) Applicant: TOYOTA MOTOR ENGINEERING & MANUFACTURING NORTH AMERICA, INC., Plano, TX (US)

(72) Inventors: Rui Guo, San Jose, CA (US); Hongsheng Lu, San Jose, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 576 days.

(21) Appl. No.: 16/713,429

(22) Filed: Dec. 13, 2019

(65) Prior Publication Data

US 2021/0183238 A1 Jun. 17, 2021

(51) Int. Cl.
| | |
|---|---|
| *G08G 1/01* | (2006.01) |
| *B60W 40/04* | (2006.01) |
| *G06N 20/00* | (2019.01) |
| *B60R 1/00* | (2022.01) |
| *G06V 20/58* | (2022.01) |
| *G06T 7/12* | (2017.01) |

(52) U.S. Cl.
CPC ............. *G08G 1/0133* (2013.01); *B60R 1/00* (2013.01); *B60W 40/04* (2013.01); *G06N 20/00* (2019.01); *G06T 7/12* (2017.01); *G06V 20/58* (2022.01); *B60R 2300/302* (2013.01)

(58) Field of Classification Search
CPC ........ G08G 1/0133; G06T 7/12; G06N 20/00; G06V 20/58; B60R 1/00; B60R 2300/302; B60W 40/04
See application file for complete search history.

(56) References Cited

U.S. PATENT DOCUMENTS

| | | | |
|---|---|---|---|
| 9,148,650 B2 | 9/2015 | Chandraker | |
| 9,300,947 B2 | 3/2016 | Park et al. | |
| 9,766,628 B1 * | 9/2017 | Lo | .......... G06V 20/584 |
| 9,792,821 B1 | 10/2017 | Yalla et al. | |
| 9,959,647 B1 * | 5/2018 | Brost | .......... G06T 7/11 |

(Continued)

OTHER PUBLICATIONS

Ron Zass & Amnon Shashua, "Probabilistic Graph And Hypergraph Matching," Online Article, URL: http://www.cs.huji.ac.il/~shashua/papers/matching-cvpr08.pdf, School of Computer Science and Engineering, The Hebrew University of Jerusalem, Aug. 28, 2019.

(Continued)

*Primary Examiner* — Yazan A Soofi
*Assistant Examiner* — Naeem Taslim Alam
(74) *Attorney, Agent, or Firm* — Dinsmore & Shohl LLP

(57) ABSTRACT

A vehicle for interpreting a traffic scene is provided. The vehicle includes one or more sensors configured to capture an image of an external view of the vehicle, and a controller. The controller is configured to obtain the captured image of the external view of the vehicle from the one or more sensors, segment a plurality of instances from the captured image, determine relational information among the plurality of instances, and generate a hyper graph including a plurality of nodes representing the plurality of instances and a plurality of edges representing the relational information among the plurality of instances.

17 Claims, 7 Drawing Sheets

(56) References Cited

U.S. PATENT DOCUMENTS

| | | | |
|---|---|---|---|
| 10,127,814 B2 | 11/2018 | Mitra et al. | |
| 2015/0221221 A1* | 8/2015 | Schaefer | G08G 1/096783 |
| | | | 340/905 |
| 2016/0112856 A1* | 4/2016 | Han | H04W 4/023 |
| | | | 455/404.1 |
| 2017/0309172 A1* | 10/2017 | Linder | G08G 1/0133 |
| 2018/0023973 A1* | 1/2018 | Ivanov | G06T 7/12 |
| | | | 701/119 |
| 2018/0307967 A1* | 10/2018 | Graf | G01S 7/417 |
| 2018/0341822 A1* | 11/2018 | Hovis | G06V 20/584 |
| 2019/0213873 A1 | 7/2019 | Adireddy et al. | |
| 2019/0220678 A1 | 7/2019 | Guo et al. | |
| 2019/0221121 A1 | 7/2019 | Guo et al. | |
| 2020/0377128 A1* | 12/2020 | Marczuk | G06Q 10/063 |
| 2021/0009163 A1* | 1/2021 | Urtasun | G06N 3/084 |
| 2022/0028254 A1* | 1/2022 | Ogawa | H04W 4/44 |

OTHER PUBLICATIONS

Alan Cameron, "Intelligent Transportation Systems Require 'The Ego Vehicle'," Online Article, URL: https://www.gpsworld.com/intelligent-transportation-systems-require-the-ego-vehicle/, May 8, 2017.

* cited by examiner

METHODS AND SYSTEMS FOR INTERPRETING TRAFFIC SCENES

TECHNICAL FIELD

The present specification relates to systems and methods for interpreting traffic scenes, and more particularly, to detecting and localizing a traffic incident by generating and comparing hyper graphs based on images captured by connected vehicles.

BACKGROUND

Understanding the traffic scene including the traffic incidents on the road is a crucial task for intelligent traffic management and autonomous driving. Heuristic approaches have been discussed for decades. The conventional heuristic approaches basically apply individual object detectors or segmentation on static images perceived by the onboard sensors of vehicles. However, traffic incidents involve much more dynamic and structured information, such as moving traffic flow and walking pedestrians. Objects involved in vehicle incidents also formulate a special layout, which are not integrated in conventional static methods.

Accordingly, a need exists for providing a method and system for detecting and localizing a traffic incident in real time.

SUMMARY

The present disclosure provides systems and methods for detecting and localizing a traffic incident in real time by generating and comparing hyper graphs based on images captured by connected vehicles. According to the present disclosure, connected vehicles generate hyper graphs, respectively and share the hyper graphs with a server, and the server localizes a traffic scene based on the hyper graphs. The hyper graph-based scene representation has several advantages including unique appearance modeling for individual objects, dynamic information representation, and structured scene layout representation. The generated hyper graph represents a traffic scene in a compact hierarchy, which is also beneficial in connected vehicle communication aspects. Specifically, communication among vehicles and servers may be faster with reduced amount of data. In addition, the server may receive hyper graphs, through a connected vehicle network from nearby vehicles perceiving the same scene from different perspectives. By matching the hyper graphs generated from multiple views, it is possible to compensate the blocked view of the traffic incident with multiple view integration. The hyper graph matching is also useful to establish correspondences from multiple view of the same scene, and then 3D vision geometry may be applied to implement the scene localization.

In one embodiment, a vehicle for interpreting a traffic scene is provided. The vehicle includes one or more sensors configured to capture an image of an external view of the vehicle, and a controller. The controller is configured to obtain the captured image of the external view of the vehicle from the one or more sensors, segment a plurality of instances from the captured image, determine relational information among the plurality of instances, and generate a hyper graph including a plurality of nodes representing the plurality of instances and a plurality of edges representing the relational information among the plurality of instances.

In another embodiment, a system for interpreting a traffic scene is provided. The system includes a first vehicle, a second vehicle, and a server communicatively coupled to the first vehicle and the second vehicle. The first vehicle is configured to obtain a first image of an external view of the first vehicle using one or more sensors of the first vehicle, segment a first set of instances from the first image, determine first relational information among the first set of instances, and generate a first hyper graph including a first set of nodes representing the first set of instances and a first set of edges representing the first relational information among the first set of instances. The second vehicle is configured to obtain a second image of an external view of the second vehicle using one or more sensors of the second vehicle, segment a second set of instances from the second image, determine second relational information among the second set of instances, and generate a second hyper graph including a second set of nodes representing the second set of instances and a second set of edges representing the second relational information among the second set of instances.

In yet another embodiment, a method for interpreting a traffic scene is provided. The method includes capturing an image of an external view of a vehicle using one or more sensors of the vehicle, segmenting a plurality of instances from the captured image, determining relational information among the plurality of instances, and generating a hyper graph including a plurality of nodes representing the plurality of instances and a plurality of edges representing the relational information among the plurality of instances.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
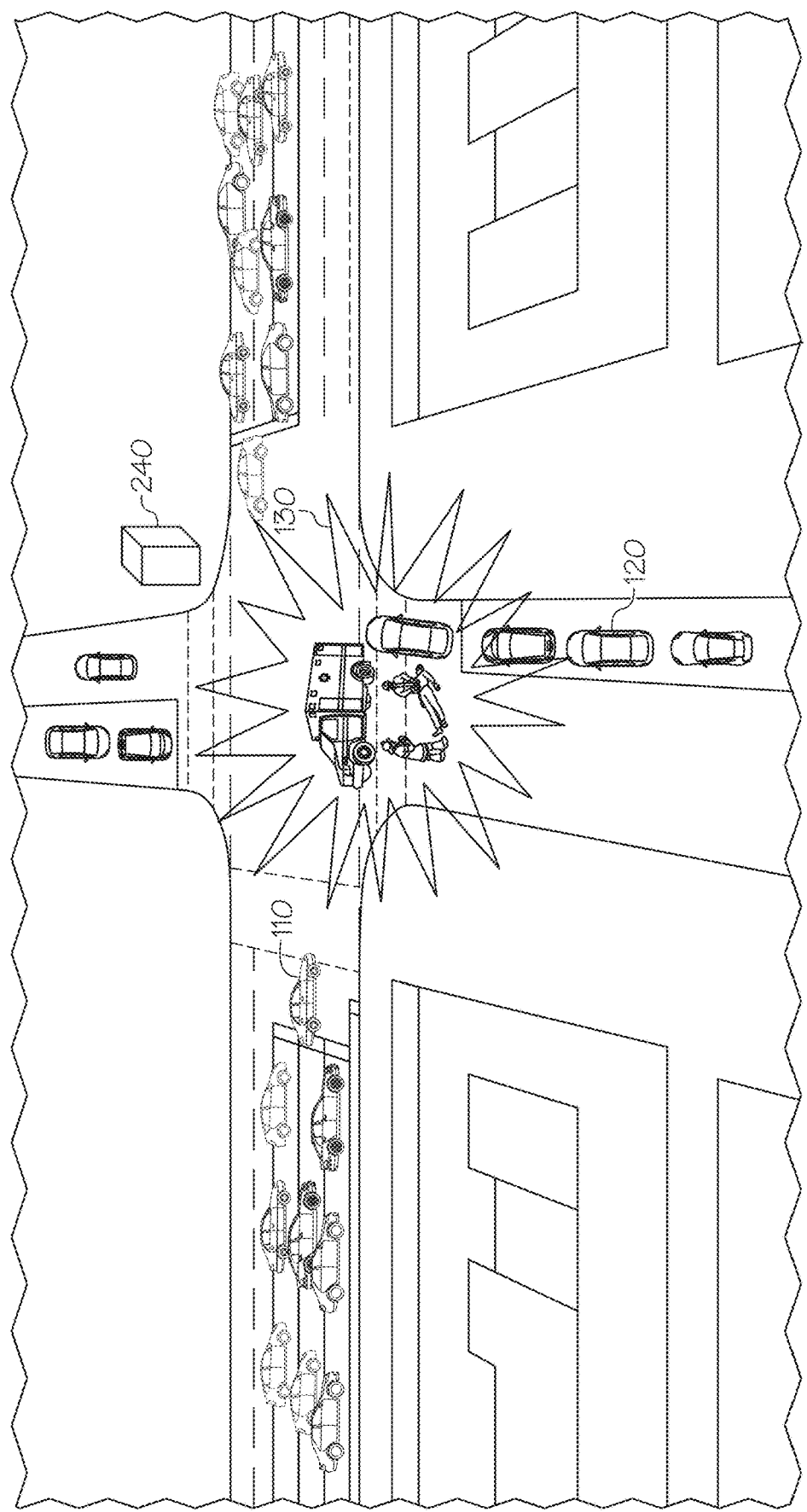
FIG. 1A schematically depicts a system for detecting and localizing a traffic incident using vehicles, according to one or more embodiments shown and described herein.
Figure 4:
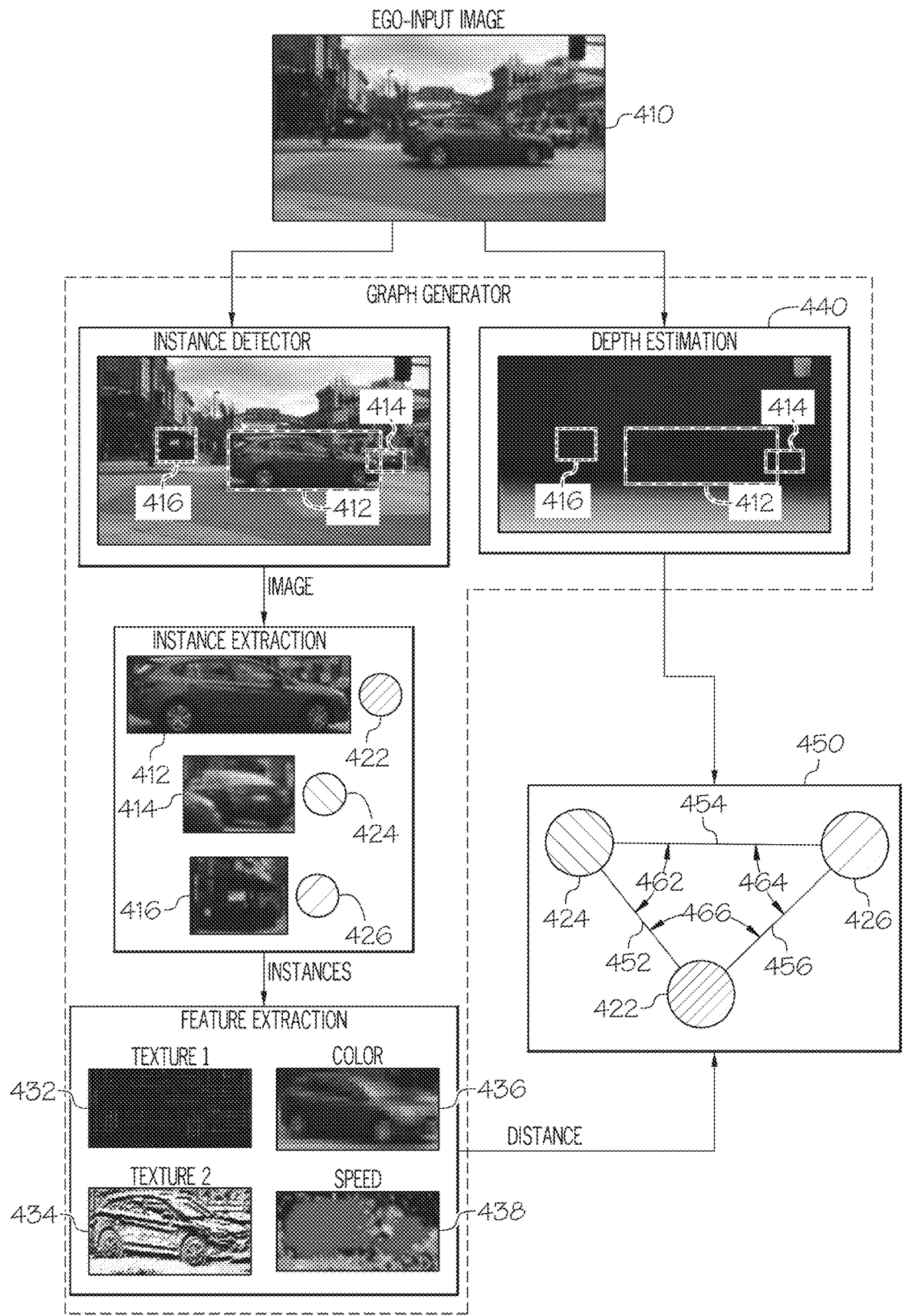
FIG. 4 depicts generating a hyper graph from an image captured by a vehicle, according to one or more embodiments shown and described herein.
Figure 6:
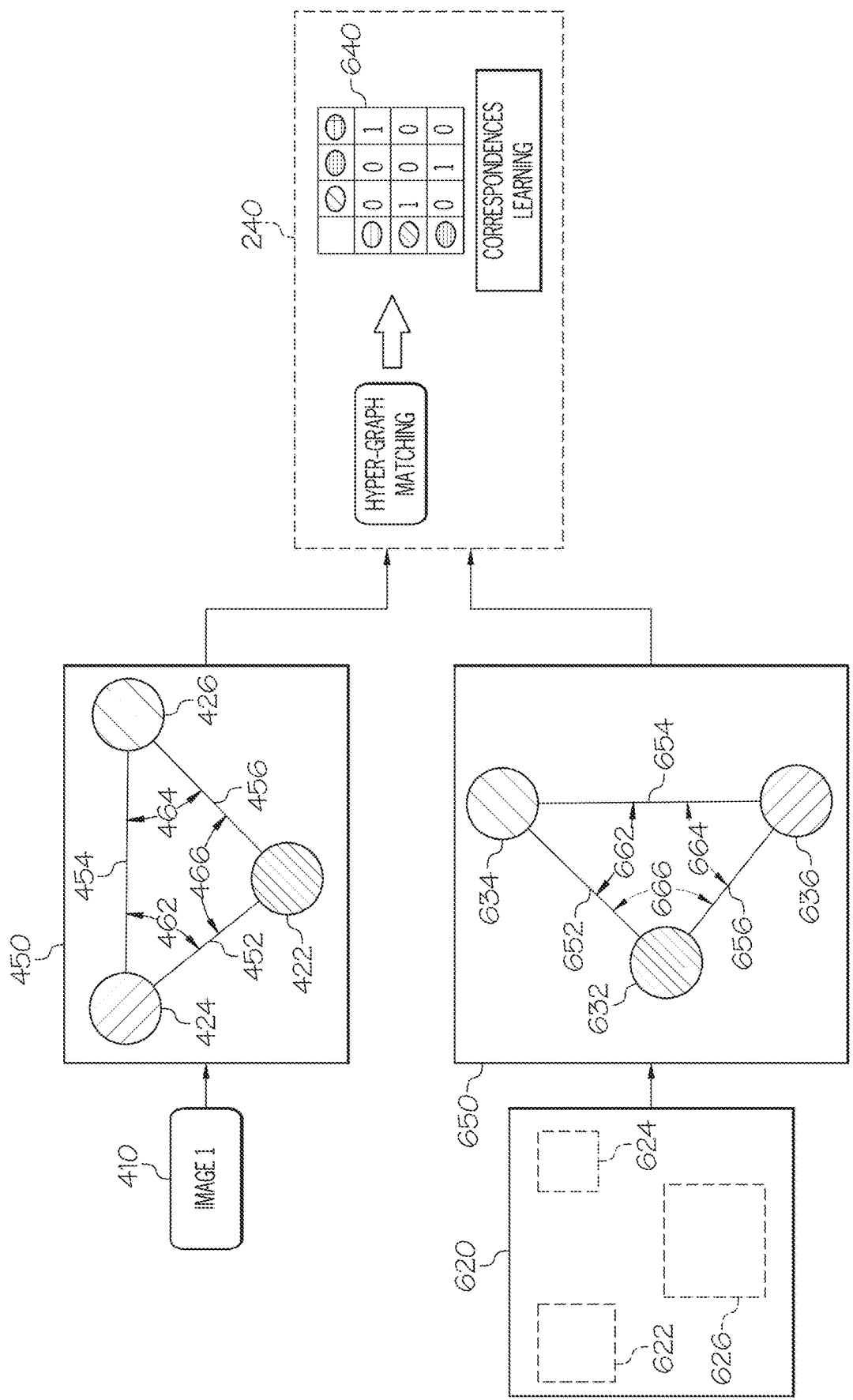
FIG. 6 depicts matching a first hyper graph with a second hyper graph, according to another embodiment shown and described herein.

The embodiments disclosed herein include systems and methods for detecting and localizing a traffic incident by generating and comparing hyper graphs based on images captured by connected vehicles. Referring to FIGS. 1A, 4 and 6, the present system includes an ego vehicle (e.g., a first connected vehicle 110) and a cooperative vehicle (e.g., a second connected vehicle 120). The first connected vehicle 110 obtains a first image 410 of an external view of the first connected vehicle 110 using one or more sensors of the first connected vehicle 110, segments a first set of instances 412, 414, 416 from the first image 410, determines first relational information among the first set of instances, and generates a first hyper graph 450 including a first set of nodes representing the first set of instances and a first set of edges representing the first relational information among the first set of instances. Then, the first connected vehicle 110 determines whether the external view of the first connected vehicle 110 includes a traffic incident based on a comparison of the first hyper graph 450 and a machine learning model. The first connected vehicle 110 transmits the first hyper graph 450 to a server 240 if it is determined that the external view includes a traffic incident based on the comparison of the hyper graph and the machine learning model.

The second connected vehicle 120 similarly generates a second hyper graph 650, determines whether the external view of the second connected vehicle 120 includes a traffic incident based on a comparison of the second hyper graph 650 and a machine learning model, and transmits the second hyper graph 650 to the server 240 if it is determined that the external view includes a traffic incident based on the comparison of the hyper graph and the machine learning model. The server 240 matches the first hyper graph 450 and the second hyper graph 650 and reconstructs a three dimensional environment of a traffic scene. based on matching of the first hyper graph with the second hyper graph.

According to the present disclosure, the hyper graph-based solution provides thorough comprehension about a traffic scene. The present system encodes not only the static object detection, but also the dynamic information associated to detected objects into the hyper graph representation. Detecting traffic incidents based on hyper graphs according to the present disclosure is more reliable and accurate. In addition, multiple view integration based on hyper graph matching may cover a larger observation range and compensate observations with additional information. This may reduce the observation uncertainty. Furthermore, hyper graph matching may help multiple view correspondence learning. Once the correspondence between hyper graphs are established, 3D environment of a traffic scene may be reconstructed. Inferring the reconstructed 3D environment may help the system localize the traffic incident and its affective area.

FIG. 1A schematically depicts a system for detecting and localizing a traffic incident using vehicles, according to one or more embodiments shown and described herein. In embodiments, a system includes first and second connected vehicles 110 and 120, and a server 240. The server 240 may be a local server including, but not limited to, roadside unit, an edge server, and the like. In some embodiments, the server 240 may be a remote server such as a cloud server.

Each of the first and second connected vehicles 110 and 120 may be a vehicle including an automobile or any other passenger or non-passenger vehicle such as, for example, a terrestrial, aquatic, and/or airborne vehicle. In some embodiment, one or more of the first and second connected vehicles 110 and 120 may be an unmanned aerial vehicle (UAV), commonly known as a drone.

The first and second connected vehicles 110 and 120 may be autonomous and connected vehicles, each of which navigates its environment with limited human input or without human input. The first and second connected vehicles 110 and 120 are equipped with internet access and share data with other devices both inside and outside the first and second connected vehicles 110 and 120. The first and second connected vehicles 110 and 120 may communicate with the server 240. The server 240 may communicated with vehicles in an area covered by the server 240. The server 240 may communicate with other servers that cover different areas. The server 240 may communicate with a remote server and transmit information collected by the server 240 to the remote server.

In FIG. 1A, the first connected vehicle 110 and the second connected vehicle 120 are encountering the same scene with different perspectives. The first connected vehicle 110 may be an ego-vehicle that views a traffic incident 130. The second connected vehicle 120 may be a cooperative vehicle that may not see some objects or portions in the view of the first connected vehicle 110. Similarly, the first connected vehicle 110 may not see some objects or portions in the view of the second connected vehicle 120.

The first connected vehicle 110 and the second connected vehicle 120 may capture images about the traffic incident 130 using one or more sensors. The recorded sensor readings of the first connected vehicle 110 and the second connected vehicle 120 may be synchronized by a universal clock time. Each of the first connected vehicle 110 and the second connected vehicle 120 may generate a hyper graph based on the captured image, as illustrated in the FIG. 1B. For example, the first connected vehicle 110 may process its captured image to generate a first hyper-graph. The second connected vehicle 120 may process its captured image to generate a second hyper graph. The details of generating a hyper graph may be described below with reference to FIGS. 3 and 4. The hyper graph may include a plurality of nodes each of which represents a segmented instance in the captured image and a plurality of edges that represent the geometric distance and/or observation angle among multiple nodes.

Figure 1B:
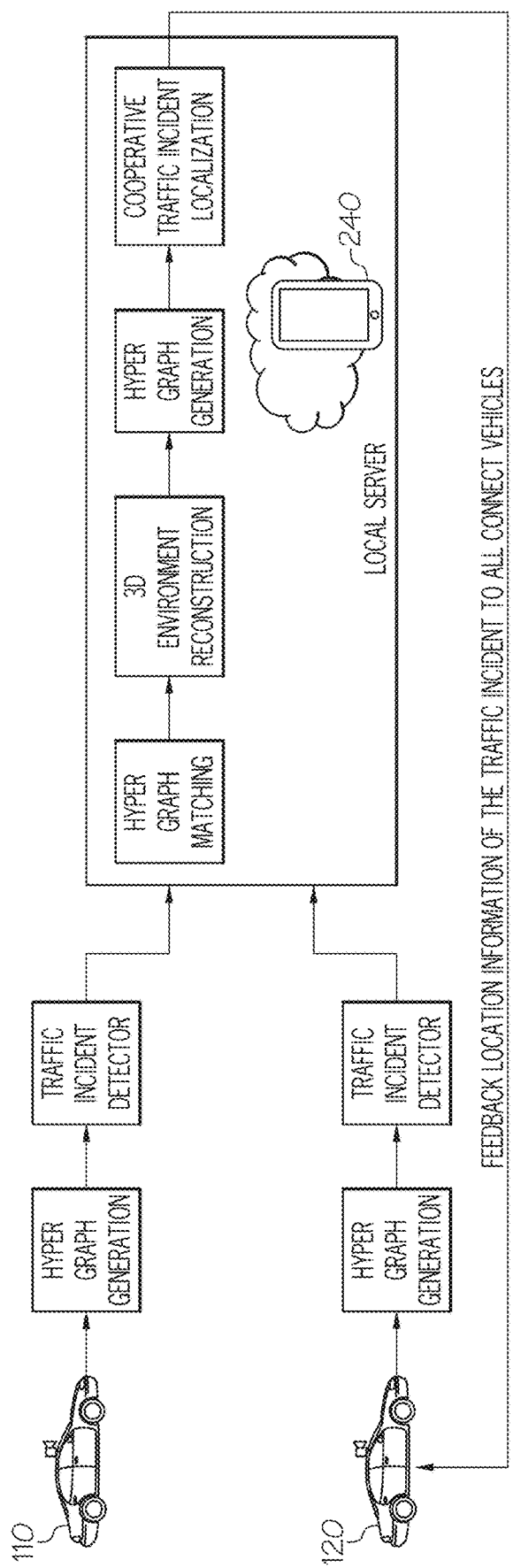
FIG. 1B depicts a schematic process for determining whether a traffic incident is present and reconstructing a 3D environment of the traffic incident, according to one or more embodiments shown and described herein.

FIG. 1B depicts a schematic process for determining whether a traffic incident is present and reconstructing a 3D environment of the traffic incident, according to one or more embodiments shown and described herein. Each of the first connected vehicle 110 and the second connected vehicle 120 may determine whether the view of the respective vehicle includes a traffic incident based on a comparison of the hyper graph and a machine learning model. For example, the first connected vehicle 110 may generate a first hyper graph based on the image captured by the first connected vehicle 110. Then, the first connected vehicle 110 may compare the first hyper graph with a machine learning model. For example, if the first hyper graph corresponds to a hyper graph of the machine learning model that is categorized as a traffic incident, the first connected vehicle 110 may determine that the view of the first connected vehicle 110 includes a traffic incident. Then, the first connected vehicle 110 may transmit the first hyper graph to the server 240. Similarly, the second connected vehicle 120 may generate a second hyper graph based on the image captured by the second connected vehicle 120. Then, the second connected vehicle 120 may compare the second hyper graph with a machine learning model. If the second hyper graph corresponds to a hyper graph of the machine learning model that is categorized as a traffic incident, the second connected vehicle 120 may determine that the view of the second connected vehicle 120 includes a traffic incident. Then, the second connected vehicle 120 may transmit the second hyper graph to the server 240.

The server 240 may receive the first hyper graph and the second hyper graph from the first connected vehicle 110 and the second connected vehicle 120 via a vehicle-to-everything (V2X) communication. The server 240 may match the first hyper graph and the second hyper graph, and establish correspondences between the first hyper graph and the second hyper graph. After the hyper graph matching is completed, the server 240 may reconstruct the 3D environment of a region co-visible to the first connected vehicle 110 and the second connected vehicle 120 using the matched hyper graphs and intrinsic corresponding information between the first hyper graph and the second hyper graph. When reconstructing the 3D environment of the co-visible region, techniques including the stereoscopic vision may be employed. Specifically, the global coordinates for the entire environment may be built based on the 3D information for the co-visible area and the GPS information associated with imaging sensors of the first connected vehicle 110 and the second connected vehicle 120.

Then, the server 240 may determine the locations of one or more objects at the traffic incident that are not co-visible to the first connected vehicle 110 and the second connected vehicle 120. The locations of the one or more object that are not co-visible may be determined based on one of the captured images by the first connected vehicle 110 and the second connected vehicle 120 and the global coordinates information. The server 240 may share the estimated location information for the objects that are not co-visible with other vehicles over the network. The server 240 may define the location of the traffic incident as the largest convex area around the localized objects of the traffic incident. The traffic incident location information is calculated by evaluating the largest convex hull that covers the objects (e.g. Graham Scan algorithm).

While FIGS. 1A and 1B describe two connected vehicles cooperatively capturing views of the traffic incident, more connected vehicles may be involved to develop the 3D environment of the traffic incident. As more connected vehicles arrive at the same traffic incident area from different directions, their observations about the traffic incident may be converted into hyper-graphs and transmitted to the server 240. The server 240 may incrementally aggregate hyper graph matching based on new observations from additional connected vehicles. The server 240 may update the location of the traffic incident gradually when a previously unseen object or area is discovered by a new cooperative vehicle. Accordingly, the server 240 may retain up-to-date information about the traffic incident.

Figure 2:
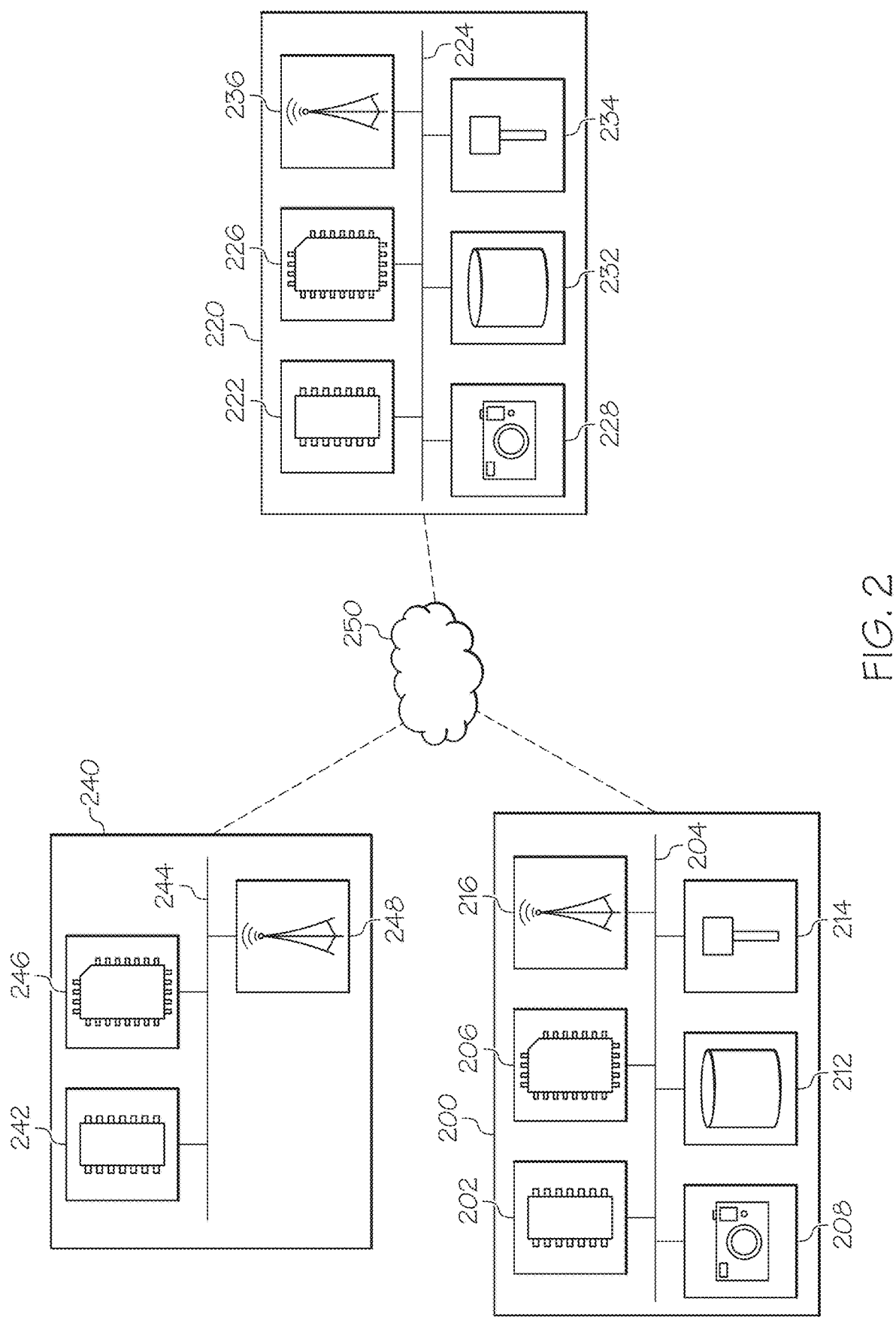
FIG. 2 schematically depicts a system for interpreting a traffic scene, according to one or more embodiments shown and described herein.

FIG. 2 schematically depicts a system for interpreting a traffic scene, according to one or more embodiments shown and described herein. The system for interpreting a traffic scene includes a first connected vehicle system 200, a second connected vehicle system 220, and a server 240.

It is noted that, while the first connected vehicle system 200 and the second connected vehicle system 220 are depicted in isolation, each of the first connected vehicle system 200 and the second connected vehicle system 220 may be included within a vehicle in some embodiments, for example, respectively within each of the connected vehicles 110 and 120 of FIG. 1A. In embodiments in which each of the first connected vehicle system 200 and the second connected vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include machine readable instructions that, when executed by the one or more processors 202, obtain a first image of an external view of the first connected vehicle system 200 using one or more sensors 212, segment a first set of instances from the first image, determine first relational information among the first set of instances, and generate a first hyper graph including a first set of nodes representing the first set of instances and a first set of edges representing the first relational information among the first set of instances. The details of generating a hyper graph will be described below with reference to FIGS. 3 and 4. The one or more memory modules 206 may store a machine learning model that stores hyper graph models that are related to traffic incidents. Specifically, the one or more memory modules 206 may store one or more pre-trained traffic incident detectors.

Referring still to FIG. 2, the first connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include image data of the traffic incident 130 in FIG. 1. In some embodiments, the one or more sensors 208 may also provide navigation support. That is, data captured by the one or more sensors 208 may be used to autonomously or semi-autonomously navigate the connected vehicle 110.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first connected vehicle system 200. The first connected vehicle system 200 may capture a traffic incident (e.g., the traffic incident 130 in FIG. 1A) using one or more imaging sensors. The one or more processors 202 may analyze the captured image to generate a hyper graph.

In operation, the one or more sensors 208 capture image data and communicates the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 200 comprises a satellite antenna 214 coupled to the communication path 204 such that the communication path 204 communicatively couples the satellite antenna 214 to other modules of the first connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first connected vehicle system 200 comprises network interface hardware 216 for communicatively coupling the first connected vehicle system 200 to the second connected vehicle system 220 and/or the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first connected vehicle system 200 may transmit its data to the server 240. For example, the network interface hardware 216 of the first connected vehicle system 200 may transmit captured images or hyper graphs generated by the first connected vehicle system 200, vehicle data, location data, and the like to other connected vehicles or the server 240.

The first connected vehicle system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first connected vehicle system 200 may be communicatively coupled to the server 240 by the network 250. In one embodiment, the network 250 may include one or more computer networks (e.g., a personal area network, a local area network, or a wide area network), cellular networks, satellite networks and/or a global positioning system and combinations thereof. Accordingly, the first connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

The one or more memory modules 246 may include machine readable instructions that, when executed by the one or more processors 242, receive a first hyper graph and a second hyper graph from the first connected vehicle system 200 and the second connected vehicle system 220, match the first hyper graph with the second hyper graph, and reconstruct a three dimensional environment of an area co-visible to the first connected vehicle system 200 and the second connected vehicle system 220 based on matching of the first hyper graph with the second hyper graph.

Still referring to FIG. 2, the second connected vehicle system 220 includes one or more processors 222, one or more memory modules 226, one or more sensors 228, one or more vehicle sensors 232, a satellite antenna 234, network interface hardware 236, and a communication path 224 communicatively connected to the other components of the second connected vehicle system 220. The components of the second connected vehicle system 220 may be structurally similar to and have similar functions as the corresponding components of the first connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the network interface hardware 236 corresponds to the network interface hardware 216, and the communication path 224 corresponds to the communication path 204).

Figure 3:
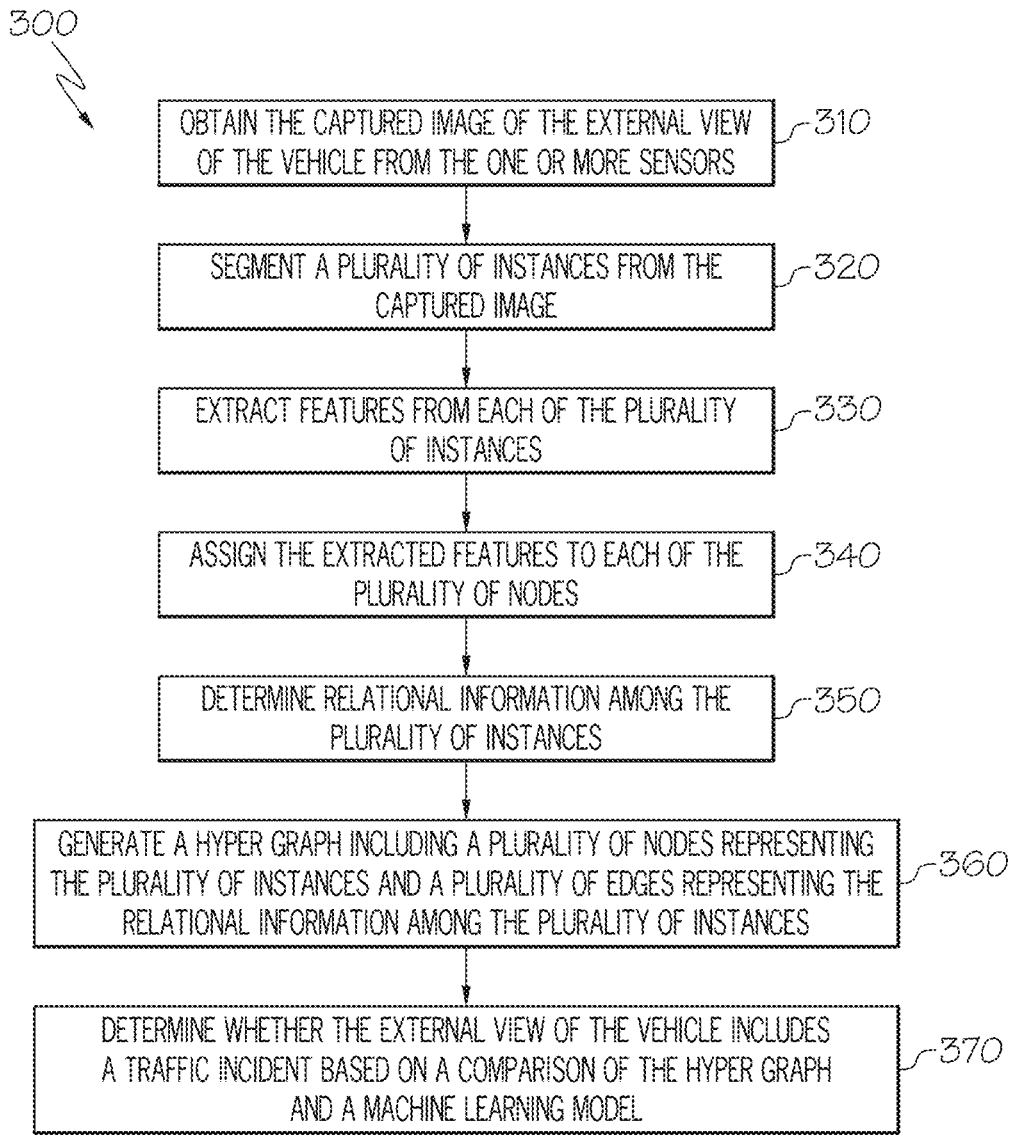
FIG. 3 depicts a flowchart for detecting a traffic incident using vehicles, according to one or more embodiments shown and described herein.

FIG. 3 depicts a flowchart 300 for detecting a traffic incident using vehicles, according to one or more embodiments shown and described herein.

In step 310, a vehicle may obtain the captured image of the external view of the vehicle from one or more sensors of the vehicle. In embodiments, by referring to FIGS. 2 and 4, the first connected vehicle system 200 may obtain an image 410 of an external view of the vehicle from one or more sensors 208. Ranging sensors such as radar sensors may be also used to determine a rough depth and speed information for the external view. The first connected vehicle system 200 may receive the rough depth and speed information from the ranging sensors.

Referring back to FIG. 3, in step 320, the vehicle may segment a plurality of instances from the captured image. In embodiments, the captured image may be segmented out at the instance level. Any object detection algorithm may be used to detect objects in the captured image. For example, as shown in FIG. 4, the first connected vehicle system 200 may segment instances 412, 414, 416 from the captured image 410. Each segmented instance may be converted into a node feature representation. For example, the instance 412 may be converted into a node 422, the instance 414 may be converted into a node 424, and the instance 416 may be converted into a node 426. While the instances 412, 414, 416 are all vehicles in FIG. 4, instances may be persons (e.g., pedestrians), animals, construction barriers, emergency road kits, and the like.

Referring back to FIG. 3, in step 330, the vehicle may extract features from each of the plurality of instances. In embodiments, the first connected vehicle system 200 may extract texture features, color features, speed features, and the like from each of the instances 412, 414, 416. For example, FIG. 4 illustrates texture features 432 and 434, color features 436, and speed features 438 extracted from the incident 412. The color features may include the color or color histogram of the instance 412. The texture features may include information about texture such as Histogram of Oriented Gradients (HOG), Scale-invariant Feature Transform (SIFT) and Speeded Up Robust Features (SURF). A deep feature from deep neural network based detector may be also considered as a general texture feature. The extracted features may also include class labels (e.g., category information). As another example, the first connected vehicle system 200 may extract other features such as an accessory attached to the instance.

Referring back to FIG. 3, in step 340, the vehicle may assign the extracted features to each of the plurality of nodes. In embodiments, the extracted features may be encoded to a corresponding node. By referring to FIG. 4, for example, the features 432, 434, 436, 438 extracted from the instance 412 are encoded to the node 422. Similarly, the features extracted from the instance 414 may be encoded to the node 424, and the features extracted from the instance 416 may be encoded to the node 426. In some embodiments, speed information for each instances 412, 414, 416 may be encoded to corresponding nodes 422, 424, 426, respectively.

Referring back to FIG. 3, in step 350, the vehicle may determine relational information among the plurality of instances. The relational information may include, but not be limited to, a geometric distance and observation angle. By referring to FIG. 4, depth estimation is implemented as shown in an image 440 captured by one or more ranging sensors such as radar sensors or LIDAR sensors. Based on the depth information, the first connected vehicle system 200 may calculate geometric distances and/or observation angles among nodes. For example, the first connected vehicle system 200 may calculate geometric distances among the instances 412, 414, 416 and/or angles among the instances 412, 414, 416 based on information obtained from ranging sensors.

Referring back to FIG. 3, in step 360, the vehicle may generate a hyper graph including a plurality of nodes representing the plurality of instances and a plurality of edges representing the relational information among the plurality of instances. For example, by referring to FIG. 4, the first connected vehicle system 200 may generate a hyper graph 450 including the nodes 422, 424, 426 that correspond to the instances 412, 414, 416, respectively and a plurality of edges. The plurality of edges may include information on geometric distances among the instances 412, 414, 416 and/or information about angles among the instances 412, 414, 416. For example, the geometric distances among the instances may be represented as lines 452, 454, 456. The angles 462, 464, 466 represent angles among the instances 412, 414, 416 that are formed based on relative locations of the instances 412, 414, 416. While the hyper graph 450 in FIG. 4 shows a triangular shape, a different shape may be formed based on the number of instances and distances between the instances. For example, the hyper graph may be a quadrangle if the number of instances is four. As another example, the hyper graph may be a hexagon if the number of instances is six. In embodiment, the hyper graph may be dynamically formed based on the location and/or speed of the instances. For example, if one or more of the instances are moving, the hyper graph may be dynamically changed based on the moving locations of the instances.

By referring back to FIG. 3, in step 370, the vehicle may determine whether the external view of the vehicle includes a traffic incident based on a comparison of the hyper graph and a machine learning model. In embodiments, the first connected vehicle system 200 may store one or more pre-trained traffic incident detectors in the one or more memory modules 206. The first connected vehicle system 200 may compare a generated hyper graph such as the hyper graph 450 in FIG. 4 to the machine learning model. For example, the traffic incident detector may classify the generated hyper graph based on the learned machine learning model. The learned machine learning model may be, for example, Conditional Random Field (CRF) based classifier. If the generated hyper graph meets the criteria of the machine learning model, the first connected vehicle system 200 may determine that the current external view includes a traffic incident, and flag the current scene as traffic incident.

In embodiments, the first connected vehicle system 200 may encode and transmit the generated hyper graph to a local server, e.g., a roadside unit, an edge server, and the like, or a virtual processing center over the vehicular network via vehicle to vehicle (V2V) communication, DSRC, millimeter wave or cellular channel.

Figure 5:
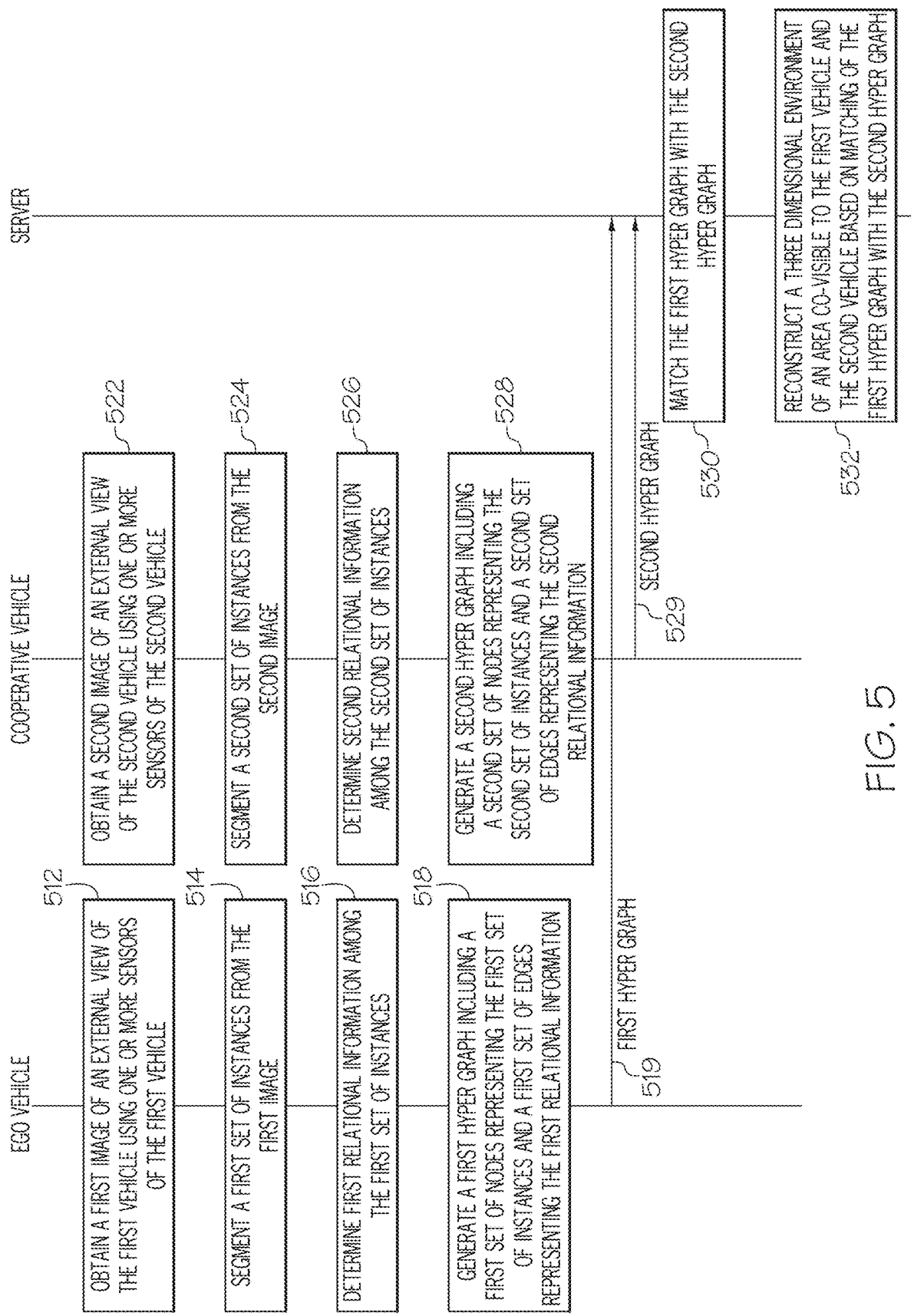
FIG. 5 depicts a flowchart for detecting and localizing a traffic incident using a plurality of vehicles, according to one or more embodiments shown and described herein.

FIG. 5 depicts a flowchart for detecting and localizing a traffic incident using a plurality of vehicles, according to one or more embodiments shown and described herein.

In step 512, a first vehicle obtains a first image of an external view of the first vehicle using one or more sensors of the first vehicle. The first vehicle may be an ego vehicle that may correspond to the first connected vehicle 110 in FIG. 1. In embodiments, by referring to FIGS. 1A, 2, 4 and 6, the first connected vehicle system 200 of the first connected vehicle 110 may obtain the image 410 of an external view of the first connected vehicle 110 from one or more sensors 208. Ranging sensors such as radar sensors may be also used to determine a rough depth and speed information for the external view. The first connected vehicle system 200 may receive the rough depth and speed information from the ranging sensors.

By referring back to FIG. 5, in step 514, the first vehicle segments a first set of instances from the first image. In embodiments, the first connected vehicle system 200 may segment a plurality of instances from the captured image 410. For example, as shown in FIG. 4, the first connected vehicle system 200 may segment a first set of instances 412, 414, 416 from the first image 410. Each segmented instance may be converted into a node feature representation. For example, the instance 412 may be converted into a node 422, the instance 414 may be converted into a node 424, and the instance 416 may be converted into a node 426. Then, the first connected vehicle system 200 may extract texture feature, color feature, speed feature, and the like from each of the instances 412, 414, 416. The first connected vehicle system 200 may assign the extracted features to each of the plurality of nodes. In embodiments, the extracted features may be encoded to a corresponding node. For example, the features 432, 434, 436, 438 extracted from the instance 412 are encoded to the node 422. Similarly, the features extracted from the instance 414 may be encoded to the node 424, and the features extracted from the instance 416 may be encoded to the node 426. In some embodiments, speed information for each instances 412, 414, 416 may be encoded to corresponding nodes 422, 424, 426, respectively.

By referring back to FIG. 5, in step 516, the first vehicle determines first relational information among the first set of instances. By referring to FIG. 4, depth estimation is implemented as shown in an image 440 captured by one or more ranging sensors such as radar sensors. Based on the depth information, the first connected vehicle system 200 may calculate geometric distances and observation angles among nodes. For example, the first connected vehicle system 200 may calculate geometric distances among the instances 412, 414, 416 and angles among the instances 412, 414, 416 based on information obtained from ranging sensors.

By referring back to FIG. 5, in step 518, the first vehicle generates a first hyper graph including a first set of nodes representing the first set of instances and a first set of edges representing the first relational information. As described above, by referring to FIG. 4, the first connected vehicle system 200 may generate the first hyper graph 450 including the nodes 422, 424, 426 representing the first set of instances 412, 414, 416 and a first set of edges representing the first relational information. The first set of edges may include information on geometric distances among the instances 412, 414, 416 and/or information about angles among the instances 412, 414, 416. For example, the geometric distances among the instances may be represented as lines 452, 454, 456. The angles 462, 464, 466 represent angles among the instances 412, 414, 416 that are formed based on relative locations of the instances 412, 414, 416.

By referring back to FIG. 5, in step 519, the first vehicle transmits the first hyper graph 450 to the server 240. In embodiments, the first vehicle may determine whether the external view of the first vehicle includes a traffic incident based on a comparison of the first hyper graph and a machine learning model. The first connected vehicle system 200 may store one or more pre-trained traffic incident detectors in the one or more memory modules 206. The first connected vehicle system 200 may compare the hyper graph 450 to the machine learning model. For example, the traffic incident detector may classify the generated hyper graph based on the learned machine learning model. The learned machine learning model may be, for example, Conditional Random Field (CRF) based classifier. If the hyper graph 450 meets the criteria of the machine learning model, the first connected vehicle system 200 may determine that the current external view includes a traffic incident, and transmit the hyper graph 450 to the server 240. In some embodiments, the first vehicle may transmit the first hyper graph 450 to the server 240 without determining whether the external view of the first vehicle includes a traffic incident.

In step 522, a second vehicle obtains a second image of an external view of the second vehicle using one or more sensors of the second vehicle. The second vehicle may be a cooperative vehicle that may correspond to the second connected vehicle 120 in FIG. 1. In embodiments, by referring to FIGS. 1A, 2, 4 and 6, the second connected vehicle system 220 of the second connected vehicle 120 may obtain the image 620 of an external view of the second connected vehicle 120 from one or more sensors 228. Ranging sensors such as radar sensors may be also used to determine a rough depth and speed information for the external view. The second connected vehicle system 220 may receive the rough depth and speed information from the ranging sensors.

In step 524, the second vehicle segments a second set of instances from the second image. In embodiments, the second connected vehicle system 220 may segment a plurality of instances from the captured image 620. For example, by referring to FIG. 6, the second connected vehicle system 220 may segment a second set of instances 622, 624, 626 from the second image 620. Each segmented instance may be converted into a node feature representation. For example, the instance 622 may be converted into a node 632, the instance 624 may be converted into a node 634, and the instance 626 may be converted into a node 636. Then, the second connected vehicle system 220 may extract texture features, color features, speed features, and the like from each of the instances 622, 624, 626, similar to the first connected vehicle system 200. The second connected vehicle system 220 may assign the extracted features to each of the plurality of nodes.

Referring back to FIG. 5, in step 526, the second vehicle determines second relational information among the second set of instances. Similar to the first connected vehicle system 200, the second connected vehicle system 220 may calculate geometric distances among the instances 622, 624, 626 in FIG. 6 and angles among the instances 622, 624, 626 based on information obtained from ranging sensors.

In step 528, the second vehicle generates a second hyper graph including a second set of nodes representing the second set of instances and a second set of edges representing the second relational information. As described above, the second connected vehicle system 220 may generate the second hyper graph 650 including the nodes 632, 634, 636 representing the second set of instances 622, 624, 626 and a second set of edges representing the second relational information. The second set of edges may include information on geometric distances among the instances 622, 624, 626 and/or information about angles among the instances 622, 624, 626. For example, the geometric distances among the instances may be represented as lines 652, 654, 656. The angles 662, 664, 666 represent angles among the instances 622, 624, 626 that are formed based on relative locations of the instances 622, 624, 626.

In step 529, the second vehicle transmits the second hyper graph 650 to the server 240. In embodiments, the second vehicle may determine whether the external view of the second vehicle includes a traffic incident based on a comparison of the second hyper graph and a machine learning model. The second connected vehicle system 220 may store one or more pre-trained traffic incident detectors in the one or more memory modules 226. The second connected vehicle system 220 may compare the second hyper graph 650 to the machine learning model. For example, the traffic incident detector may classify the generated hyper graph based on the learned machine learning model. If the second hyper graph 650 meets the criteria of the machine learning model, the second connected vehicle system 220 may determine that the current external view includes a traffic incident, and transmit the second hyper graph 650 to the server 240. In some embodiments, the second vehicle may transmit the second hyper graph 650 to the server 240 without determining whether the external view of the second vehicle includes a traffic incident.

In step 530, the server 240 matches the first hyper graph with the second hyper graph. The matching process may be a similarity comparison process based on a special distance metric. The theoretical principle behind the matching process is the view-invariant property of the scene. Metrics decomposition and computation may be involved to conduct further optimization and robust matching. For example, the nodes 422, 424, 426 of the first hyper graph 450 may be compared with the nodes 632, 634, 636 of the second hyper graph 650. A table 640 may show correspondences between the nodes 422, 424, 426 and the nodes 632, 634, 636. Based on the features encoded in each nodes, the server 240 may determine that the node 422 correspond to the node 632, the node 424 corresponds to the node 634, and the node 426 corresponds to the node 636. As another example, the angles 462, 464, 466 may be compared with the angles 662, 664, 666. Specifically, the angle 462 may match with the angle 662, the angle 464 may match with the angle 664, and the angle 466 may match with the angle 666. In order to facilitate the best matching result, the server 240 may be trained offline with labeled dataset to supervise parameter tuning. After matching, the correspondences between two hyper-graph are established.

In step 532, the server 240 reconstructs a three dimensional environment of an area co-visible to the first vehicle and the second vehicle based on matching of the first hyper graph with the second hyper graph. After the first hyper graph and the second hyper graph are matched, the matched hyper graphs and intrinsic corresponding information may be utilized for reconstructing 3D environment in the co-visible region using techniques such as stereoscopic vision.

The global coordinates for the entire environment may be built based on the 3D information for the co-visible area and the GPS information associated with each sensors of the first vehicle and the second vehicle. For the non-covisible object location reasoning, the non-covisible object may be localized based on single view detection and global coordinates information. The estimated location information for the non-covisible objects may be shared over the vehicular network for different applications. In embodiments, the location of the traffic incident may be defined as the largest convex area around the localized objects. The server 240 may calculate the traffic incident location information by evaluating the largest convex hull that covers the objects (e.g. Graham Scan algorithm).

While FIGS. 5 and 6 describe two vehicles collaborating, more than two vehicles may collaborate to identify and localize vehicle incidents. As more connected vehicles encounter the same traffic incident area from different directions, their individual observation about the traffic incident may be converted into hyper graphs and transmitted to the server 240. At the server 240, the computation about the matching incrementally aggregates each new observation from the connected vehicles. Thus, the location and details of the traffic incident may be gradually updated as the previous unseen portions are discovered by new cooperative vehicles. In this way, up-to-date information about the traffic incident may be obtained.

It should be understood that embodiments described herein are directed to methods and systems for detecting and localizing a traffic incident by generating and comparing hyper graphs based on images captured by connected vehicles. The system includes a first vehicle and a second vehicle. The first vehicle obtains a first image of an external view of the first vehicle using one or more sensors of the first vehicle, segments a first set of instances from the first image, determines first relational information among the first set of instances, and generates a first hyper graph including a first set of nodes representing the first set of instances and a first set of edges representing the first relational information among the first set of instances. Then, the first vehicle determines whether the external view of the first vehicle includes a traffic incident based on a comparison of the first hyper graph and a machine learning model. The first vehicle transmits the first hyper graph to a server if it is determined that the external view includes a traffic incident based on the comparison of the hyper graph and the machine learning model.

According to the present disclosure, the hyper graph-based solution provides thorough comprehension about a traffic scene. The present system encodes not only static object detection, but also dynamic information associated to detected objects into hyper graph representations. Detecting traffic incidents based on hyper graphs according to the present disclosure is more reliable and accurate as compared to conventional traffic incident detection methods. In addition, multiple view integration based on hyper graph matching may cover a larger observation range and compensate observations with additional information. This may reduce the observation uncertainty. Furthermore, hyper graph matching may help multiple view correspondence learning. Once the correspondence between hyper graphs are established, a 3D environment of a traffic scene may be reconstructed. Inferring the reconstructed 3D environment may help to localize the traffic incident and its affective area.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle for interpreting a traffic scene, the vehicle comprising:
   one or more sensors configured to capture an image of an external view of the vehicle; and
   a controller configured to:
      obtain the captured image of the external view of the vehicle from the one or more sensors;
      segment a plurality of instances from the captured image;
      determine relational information among the plurality of instances;
      generate a hyper graph including a plurality of nodes representing the plurality of instances and a plurality of edges representing the relational information among the plurality of instances; and
      determine whether the external view of the vehicle includes an emergency based on a comparison of the hyper graph and a machine learning model,
      wherein the controller autonomously or semi-autonomously navigates the vehicle based on data from the one or more sensors.

2. The vehicle of claim 1, wherein the controller is further configured to transmit the hyper graph to a server in response to the determination that the external view includes the emergency based on the comparison of the hyper graph and the machine learning model.

3. The vehicle of claim 1, wherein the machine learning model includes statistical graph models for classifying the hyper graph.

4. The vehicle of claim 1, wherein the controller is further configured to:
   extract features from each of the plurality of instances; and
   assign the extracted features to respective nodes of the plurality of nodes.

5. The vehicle of claim 4, wherein the extracted features include at least one of colors, textures, deep features based on a deep neural network, and class labels.

6. The vehicle of claim 1, wherein the one or more sensors include one or more ranging sensors configured to obtain speed information of the plurality of instances, and
   the controller is further configured to:
      obtain the speed information of the plurality of instances from the one or more sensors; and
      encode the speed information of the plurality of instances to the plurality of nodes.

7. The vehicle of claim 1, wherein the relational information includes at least one of geometric distances among the plurality of instances, and an observation angle among the plurality of instances.

8. A system for interpreting a traffic scene, the system comprising:

a first vehicle configured to:
   obtain a first image of an external view of the first vehicle using one or more sensors of the first vehicle;
   segment a first set of instances from the first image;
   determine first relational information among the first set of instances; and
   generate a first hyper graph including a first set of nodes representing the first set of instances and a first set of edges representing the first relational information among the first set of instances;
a second vehicle configured to:
   obtain a second image of an external view of the second vehicle using one or more sensors of the second vehicle;
   segment a second set of instances from the second image;
   determine second relational information among the second set of instances; and
   generate a second hyper graph including a second set of nodes representing the second set of instances and a second set of edges representing the second relational information among the second set of instances; and
a server communicatively coupled to the first vehicle and the second vehicle,
wherein:
the first vehicle is further configured to determine whether the external view of the first vehicle includes an emergency based on a comparison of the first hyper graph and a machine learning model; and
the second vehicle is further configured to determine whether the external view of the second vehicle includes an emergency based on a comparison of the second hyper graph and the machine learning model,
wherein the first vehicle is autonomously or semi-autonomously navigated based on data from the one or more sensors of the first vehicle and the second vehicle is autonomously or semi-autonomously navigated based on data from the one or more sensors of the second vehicle.

9. The system of claim 8, wherein:
the first vehicle is further configured to transmit the first hyper graph to the server in response to the determination that the external view of the first vehicle includes the emergency based on the comparison of the first hyper graph and the machine learning model; and
the second vehicle is further configured to transmit the second hyper graph to the server in response to the determination that the external view of the second vehicle includes the emergency based on the comparison of the second hyper graph and the machine learning model.

10. The system of claim 9, wherein the server is configured to:
receive the first hyper graph and the second hyper graph;
match the first hyper graph with the second hyper graph; and
reconstruct a three dimensional environment of an area co-visible to the first vehicle and the second vehicle based on matching of the first hyper graph with the second hyper graph.

11. The system of claim 10, wherein the server is configured to:
match the first hyper graph with the second hyper graph by matching the first set of nodes with the second set of nodes or matching the first set of edges with the second set of edges.

12. The system of claim 8, wherein:
the first vehicle is further configured to extract features from each of the first set of instances, and assign respective extracted features from the first set of instances to respective nodes of the first set of nodes; and
the second vehicle is further configured to extract features from each of the second set of instances, and assign respective extracted features from the first set of instances to respective nodes of the second set of nodes.

13. The system of claim 12, wherein the extracted features include at least one of colors, textures, deep features based on a deep neural network, and class labels.

14. The system of claim 8, wherein the first vehicle is further configured to obtain speed information of the first set of instances from the one or more sensors of the first vehicle, and encode the speed information of the first set of instances to the first set of nodes; and
the second vehicle is further configured to obtain speed information of the second set of instances from the one or more sensors of the second vehicle, and encode the speed information of the second set of instances to the second set of nodes.

15. The system of claim 8, wherein:
the first relational information among the first set of nodes includes at least one of geometric distances among the first set of instances, and an observation angle among the first set of instances; and
the second relational information among the second set of nodes includes at least one of geometric distances among the second set of instances, and an observation angle among the second set of instances.

16. A method for interpreting a traffic scene, the method comprising:
capturing an image of an external view of a vehicle using one or more sensors of the vehicle;
segmenting a plurality of instances from the captured image;
determining relational information among the plurality of instances;
generating a hyper graph including a plurality of nodes representing the plurality of instances and a plurality of edges representing the relational information among the plurality of instances; and
determining whether the external view of the vehicle includes an emergency based on a comparison of the hyper graph and a machine learning model,
wherein the vehicle is autonomously or semi-autonomously navigated based on data from the one or more sensors.

17. The method of claim 16, further comprising:
transmitting the hyper graph from the vehicle to a server in response to determining that the external view includes the emergency based on the comparison of the hyper graph and the machine learning model.

* * * * *